(12) United States Patent
Bobe et al.

(10) Patent No.: US 9,670,414 B2
(45) Date of Patent: Jun. 6, 2017

(54) METHOD OF PRODUCTION OF FUEL FROM PLANT OILS

(71) Applicant: Tyton BioSciences, LLC, Danville, VA (US)

(72) Inventors: Iulian Bobe, Danville, VA (US); Sandeep Kumar, Danville, VA (US); Florin Barla, Danville, VA (US)

(73) Assignee: Tyton Biosciences, LLC, Danville, VA (US)

( * ) Notice: Subject to any disclaimer, the term of this patent is extended or adjusted under 35 U.S.C. 154(b) by 0 days.

(21) Appl. No.: 15/055,390

(22) Filed: Feb. 26, 2016

(65) Prior Publication Data

US 2016/0251580 A1    Sep. 1, 2016

Related U.S. Application Data

(60) Provisional application No. 62/121,206, filed on Feb. 26, 2015.

(51) Int. Cl.
- *C07C 1/20* (2006.01)
- *C10G 1/00* (2006.01)
- *C10G 3/00* (2006.01)

(52) U.S. Cl.
CPC ............... *C10G 3/44* (2013.01); *C10G 3/52* (2013.01); *Y02P 30/20* (2015.11)

(58) Field of Classification Search
CPC .................................... C07C 1/20; C10G 1/00
USPC ........................................... 585/240–242, 733
See application file for complete search history.

(56) References Cited

U.S. PATENT DOCUMENTS

| 7,691,159 | B2  |   | 4/2010 | Li |
|---|---|---|---|---|
| 7,931,711 | B2 |   | 4/2011 | Wootton et al. |
| 2009/0069610 | A1 | * | 3/2009 | Roberts, IV ........... C10G 45/58 585/24 |
| 2010/0050502 | A1 |   | 3/2010 | Wu et al. |
| 2011/0158899 | A1 | * | 6/2011 | Nakahara .................. C01B 3/22 423/648.1 |
| 2011/0179703 | A1 | * | 7/2011 | Gupta ...................... C10G 1/02 44/621 |
| 2014/0073822 | A1 | * | 3/2014 | Wei .......................... C10G 1/02 585/16 |

OTHER PUBLICATIONS

Fu et al; "Activated Carbons for Hydrothermal Decarboxylation of Fatty Acids"; ACS Catalysis; pp. 227-231; Feb. 15, 2011.*
Cheng, J. et al.: "Optimizing catalysis conditions to decrease aromatic hydrocarbons and increase alkanes for improving jet biofuel quality", Bioresource Technology 158 (2014) 378-382, doi: 10.1016/j.biortech.2014.02.112.
Wang, C. et al.: "One-step hydrotreatment of vegetable oil to produce high quality diesel-range alkanes", ChemSusChem 2012, 5, 1974-1983, doi: 10.1002/cssc.201200219.

\* cited by examiner

*Primary Examiner* — Thuan D Dang
(74) *Attorney, Agent, or Firm* — NK Patent Law, PLLC

(57) ABSTRACT

The presently disclosed subject matter is directed to a method of processing plant oil to produce high grade fuel such as biodiesel and jet fuel. Particularly, a method is provided that includes treating an oil under hydrothermal conditions in the presence of i) an acid that acts as an in situ source of hydrogen and ii) an activated carbon essentially free of a metal catalyst, wherein the treating results in production of liquid hydrocarbons for use as a fuel.

22 Claims, 1 Drawing Sheet

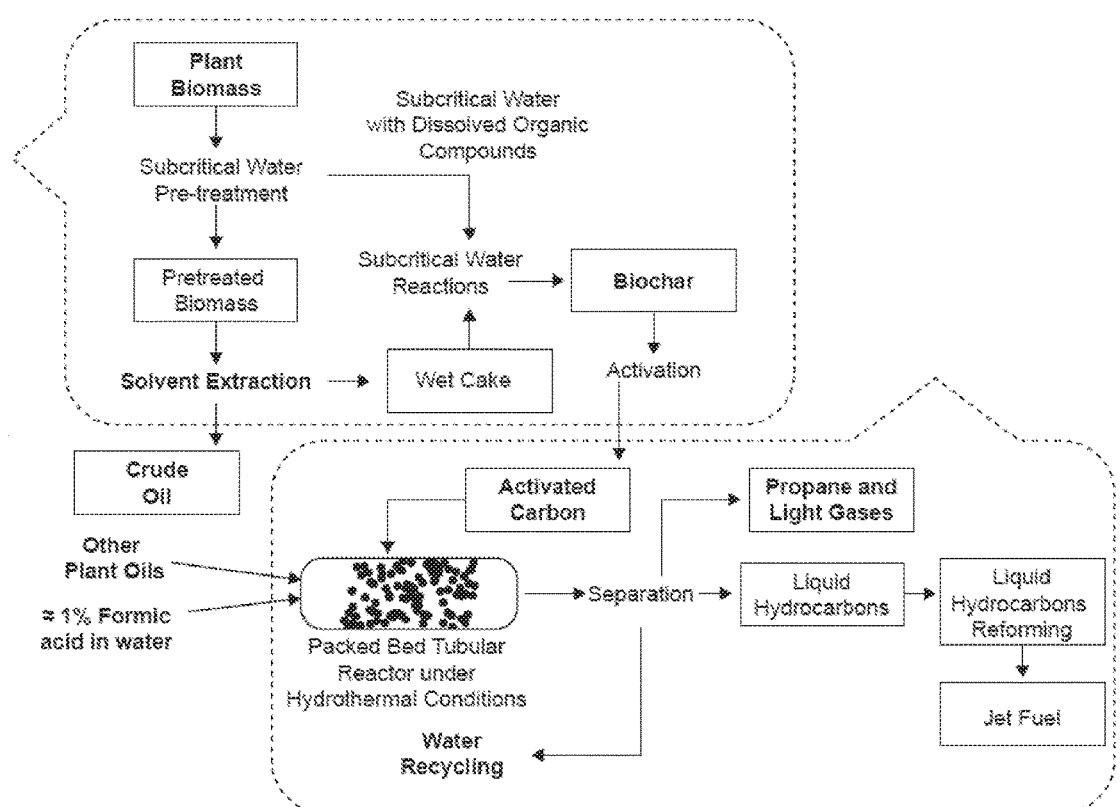

METHOD OF PRODUCTION OF FUEL FROM PLANT OILS

CROSS REFERENCE TO RELATED APPLICATIONS

The present application claims the benefit under 35 U.S.C. §119(e) of U.S. Provisional Patent Application Ser. No. 62/121,206 filed on Feb. 26, 2015, the entire content of which is incorporated herein by reference.

FIELD OF INVENTION

The presently disclosed subject matter generally relates to methods of processing plant oils under hydrothermal conditions to produce fuel.

BACKGROUND

Finding fuel sources for engines and other machines running off of combustible fuels continues to be a problem of economic concern. In recent years, there has been increased focus on the use of renewable energy sources in power generation processes. One particular source of biofuel is biomass, a general term that refers to materials derived from living plants and generated by photosynthesis, such as wood, forest byproducts, and other cellulosic materials (although there has also been significant interest in algal biomass as well). However, there are challenges associated with converting biomass into higher grade fuels. For example, the physical density of lignocelluloses (such as wood) can make penetration of the biomass structure with chemicals difficult. In addition, although a variety of fuels can be produced from biomass resources (such as ethanol, methanol, and vegetable oil) these fuels require either new distribution technologies and/or combustion technologies appropriate for their characteristics.

While advancements have been made in converting various biomasses into a biodiesel type fuel, a need still exists for a method of producing higher grade fuel from a biomass.

SUMMARY

In one embodiment, a method is provided for producing fuel from oil, the method comprising treating an oil under hydrothermal conditions in the presence of i) an acid that acts as an in situ source of hydrogen and ii) an activated carbon essentially free of a metal catalyst, wherein the treating results in production of liquid hydrocarbons for use as a fuel.

In one embodiment, a method is provided for producing fuel from oil, the method comprising: processing a plant biomass under subcritical water conditions to produce a biochar; activating the biochar to produce an activated carbon; and treating an oil under hydrothermal conditions in the presence of i) an acid that acts as an in situ source of hydrogen and ii) the activated carbon essentially free of a metal catalyst, wherein the treating results in production of liquid hydrocarbons for use as a fuel.

BRIEF DESCRIPTION OF THE DRAWING

The previous summary and the following detailed description are to be read in view of the drawing, which illustrates particular exemplary embodiments and features as briefly described below. The summary and detailed descriptions, however, are not limited to only those embodiments and features explicitly illustrated.

The Figure is a diagram that illustrates a method and process for creating fuel from oil in accordance with some embodiments of the presently disclosed subject matter.

DETAILED DESCRIPTION

The disclosed methods teach the production of liquid hydrocarbons from oil, including oils processed from plant biomass and plant seed, using supercritical and/or near supercritical water as a reaction medium, activated carbon as a catalyst, and an acid as a source of hydrogen. Unless otherwise defined, all technical terms used herein have the same meaning as commonly understood by one of ordinary skill in the art to which this disclosure belongs.

Following long-standing patent law convention, the terms "a," "an," and "the" refer to one or more when used in this application, including the claims. Thus, for example, reference to "a catalyst" includes a plurality of catalysts, unless the context clearly is to the contrary.

For the purposes of this specification and appended claims, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

In some embodiments, the term "biomass" as used herein refers to biological material that can be used as fuel or for industrial production. Most commonly, biomass refers to plant matter grown for use as biofuel, but it also can include plant or animal matter used for production of fibers, chemicals or heat. In some embodiments, biomass can include biodegradable wastes that can be used as fuel. According to the presently disclosed subject matter, biomass can be derived from a single source or can comprise a mixture derived from more than one source (such as a mixture of corn cobs and corn stover or a mixture of grass and leaves). Biomass includes, but is not limited to, bioenergy crops, tobacco plant, algal biomasses, agricultural residues, municipal solid waste, industrial solid waste, sludge from paper manufacture, yard waste, wood and forestry waste. Examples of biomass can further include (but are not limited to) microalgae, macroalgae, tobacco, tobacco seed, plant seed, corn grain, corn cobs, crop residues such as corn husks, corn stover, corn steep liquor, grasses, wheat, wheat straw, barley, barley straw, grain residue from barley degradation during brewing of beer, hay, rice straw, switchgrass, waste paper, sugar cane bagasse, sorghum, soy, components obtained from processing of grains, trees, branches, roots, leaves, wood chips, sawdust, shrubs and bushes, soybean hulls, vegetables, fruits, flowers and animal manure.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

The term "fuel" as used herein refers to liquid hydrocarbon that can be used to produce heat and/or power when burned. For the purposes of the specification and claims, the term fuel includes (but is not limited to) diesel, biodiesel, jet fuel, and the like, and the terms "fuel", "diesel", "biodiesel", and "jet fuel" are herein used interchangeably.

The term "hydrothermal" as used herein refers to an aqueous system under pressure and increased temperature, typically near to or above the critical point of water (374° C., 221 bar).

As used herein, the term "supercritical water" refers to water that is at or above the critical temperature (374° C.) and at or above its critical pressure (221 bar). Water that is just below the critical temperature and/or pressure can be referred to as "near-supercritical" water.

The descriptions herein are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

In one embodiment, a method is provided for producing fuel from oil, the method comprising treating an oil under hydrothermal conditions in the presence of i) an acid that acts as an in situ source of hydrogen and ii) an activated carbon essentially free of a metal catalyst, wherein the treating results in production of liquid hydrocarbons for use as a fuel.

In one embodiment, a method is provided for producing fuel from oil, the method comprising: processing a plant biomass under subcritical water conditions to produce a biochar; activating the biochar to produce an activated carbon; and treating an oil under hydrothermal conditions in the presence of i) an acid that acts as an in situ source of hydrogen and ii) the activated carbon essentially free of a metal catalyst, wherein the treating results in production of liquid hydrocarbons for use as a fuel.

The Figure illustrates the one or more embodiments of the disclosed methods for producing fuel from oil under hydrothermal conditions. Particularly, the oil can include a plant oil, a plant seed oil, or a waste oil, and combinations thereof. In some embodiments, the biomass can be a non-food biomass, such as tobacco. In some embodiments, the plant oil comprises tobacco oil. In some embodiments, the plant seed oil comprises tobacco seed oil. In some embodiments, the oil comprises at least 60 weight % $C_{17}$ or higher fatty acids. In the method, the reaction byproducts can include water, propane, light gases and liquid hydrocarbons. The presently disclosed subject matter also includes embodiments wherein the short chain (less than $C_{17}$) liquid hydrocarbons are converted to meet the higher grade fuel standards using a separate hydrocarbon reforming reactor such as, for example, with a commercially viable process (i.e., isomerization and/or aromatization). In some embodiments, the method further comprises a process for reforming the liquid hydrocarbons of carbon chain length less than 17 to produce the fuel.

In some embodiments, the activated carbon catalyst can be produced from a biochar using methods well known in the art. In some embodiments, the acid catalyst can be any acid that acts as an in situ source of hydrogen, as would be apparent to those of ordinary skill in the art. For example, in some embodiments the acid can be formic acid. In some embodiments, the formic acid can be at a concentration of about 0.3-5%, 0.3-3%, 0.3-1%, or about 1%.

The disclosed methods can be performed at a temperature of about 350° C. to 400° C., a pressure of about 3500 PSI, or both. In some embodiments, the activated carbon is comprised in a reactor and the treating is performed in the reactor in a continuous or a non-continuous manner. In some embodiments, the reactor can be a continuous packed bed tubular reactor. In some embodiments, the reactor is a single packed bed tubular continuous reactor and the treating is performed for a time period of about 15 minutes to about 30 minutes. In some embodiments, the treating is performed in a non-continuous or batch manner for a time ranging from about 50 to about 70 minutes. In some embodiments, the treating is performed for a time period of about 10-60 minutes, 10-50 minutes, 10-40 minutes, or 10-30 minutes.

As described above, in some embodiments, the disclosed method includes processing a plant biomass under subcritical water conditions to produce a biochar, and activating the biochar to produce an activated carbon essentially free of a metal catalyst for use in the treating of oil under hydrothermal conditions. The biochar is produced from plant biomass such as, but not limited to, tobacco biomass. Particularly, in some embodiments, plant biomass can be pre-treated using subcritical water and then a solvent extraction process performed to segregate the biomass into crude oil and wet cake. The wet cake can undergo a subcritical water reaction, to produce a biochar. In some embodiments, the biochar is then activated using known methods to form a carbon-containing catalyst (such as, but not limited to, activated carbon).

The disclosed method for production of liquid hydrocarbons suitable for fuel comprises hydrolysis of triacylglycerols (TAG) in the oil to free fatty acids and glycerol in the hydrothermal medium (Colgate-Emery process).

TAG+3H$_2$O→3 Fatty acids+glycerol (C$_3$H$_8$O$_3$).

The disclosed method further comprises the hydrogenation of unsaturated (double bond) fatty acids in the plant oil using hydrogen generated by the acid.

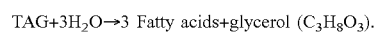
(stearic acid).

Further, the disclosed method allows conversion of saturated $C_{18}$ fatty acids to n-alkane (which can be primarily heptadecane in some embodiments) via decarboxylation and decarbonylation in the hydrothermal medium.

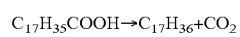

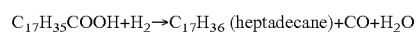

Under the disclosed process conditions, glycerol is converted to propane (byproduct) and other light gases. The minor reaction products (C$_9$-C$_{16}$ alkanes) are also produced due to C—C bond cracking under the temperature conditions. Subsequently, as set forth above, conversion of n-alkanes (hydrocarbons with chain lengths shorter than C$_{17}$) to higher grade fuel specifications can be accomplished in a separate hydrocarbon reforming (isomerization and aromatization) process using a commercially viable process.

The methods disclosed herein dramatically reduce processing time, processing steps, hydrogen consumption, and cost compared to other available or emerging technologies.

Continuing, the methods disclosed herein do not require hydrogen gas, because the acid that acts as an in situ source of hydrogen (such as formic acid) is used as a hydrogen generator to eliminate any mass transfer limitations due to the slow diffusion of hydrogen in the liquid phase. Further, hydrogen consumption (generated from the acid) is minimal and is consumed only to saturate any unsaturated fatty acids during the deoxygenation process. The generated hydrogen becomes part of the fuel molecule, thereby increasing the energy density of the product mixture.

One advantage of the presently disclosed method is that the disclosed hydrothermal medium is favorable for the hydrolysis of lipids/triglycerides without using alkali or acid catalysts. The subsequent decarboxylation of the produced fatty acids into hydrocarbons can be accomplished in the same aqueous medium without prior separation. The disclosed process further advantageously allows for the significant reduction of reaction time and provides for control of input and output, making the process easily scalable. The disclosed method uses non-toxic and low cost activated carbon produced from plant materials (plant biomass) as a decarboxylation catalyst (compared to expensive and toxic chemicals such as $CoMo/Al_2O_3$, Pt/C, Pd/C that are currently being used as traditional catalysts for hydrothermal reactions). In the methods of the present disclosure, the activated carbon is essentially free of a metal catalyst.

Further, the disclosed methods allow for the hydrolysis of triacylglycerols to free fatty acids and glycerol in hydrothermal medium, hydrogenation of unsaturated fatty acids using in situ hydrogen provided by the acid that acts as an in situ source of hydrogen, and conversion of saturated fatty acids, including $C_{18}$ saturated fatty acids, to n-alkane via decarboylation and decarbonylation in hydrothermal medium. These steps can be conducted in a short time and using, for example, a single tubular continuous reactor under hydrothermal/aqueous conditions. For example, in some embodiments, the disclosed method takes place in about 15 to about 30 minutes.

EXAMPLES

Example 1

Production of Fuel from Tobacco Oil

An experiment was conducted using tobacco oil. The gas chromatography (GC-FID) analysis of tobacco oil indicated the following composition which is shown below in Table I.

TABLE I

| Fatty acid | Peak area, % |
|---|---|
| Palmitic (16:0) | 8.5 |
| Oleic and stearic (18:1 + 18:0) | 13.5 |
| Linoleic (18:2) | 77.0 |
| Linolenic (18:3) | 0.5 |

The tobacco oil was treated as follows to convert the TAG in the oil into liquid hydrocarbon useful as a high grade fuel, such as jet fuel, according to the method illustrated in the FIGURE. Specifically, 0.2 mL/min of the tobacco oil and 1 mL/min of 1% formic acid in water at 385° C. and 3500 psi was run through a continuous flow tubular reactor packed with activated carbon catalyst produced by activating biochar processed from plant biomass as shown in the FIGURE. The liquid hydrocarbon products were separated and analyzed using GC and GC-MS. The percent conversion of the TAG in the tobacco oil to hydrocarbons was 67% with 70% selectivity to heptadecane ($C_{17}H_{36}$) along with other n-alkanes ranging from $C_9$ to $C_{16}$ in the product mixture. The gaseous products that also resulted from this method contained 32% weight propane ($C_3H_8$), 49% weight $CO_2$, and 10% weight methane, as well as other light gases.

What is claimed is:

1. A method for producing fuel from oil, the method comprising treating an oil comprising triacylglycerols under hydrothermal conditions in the presence of:
    i) an acid that acts as an in situ source of hydrogen and
    ii) an activated carbon essentially free of a metal catalyst,
    wherein the treating comprises hydrolyzing the triacylglycerols in the oil to free unsaturated and saturated fatty acids and glycerol, hydrogenating the unsaturated fatty acids using hydrogen generated by the acid, and converting the saturated fatty acids via decarboxylation and decarbonylation to liquid hydrocarbons for use as a fuel.

2. The method of claim 1, wherein the activated carbon is produced by activation of a biochar from a plant biomass.

3. The method of claim 1, wherein the oil comprises a plant oil, a plant seed oil, or a waste oil, and combinations thereof.

4. The method of claim 3, wherein the plant oil comprises tobacco oil.

5. The method of claim 3, wherein the plant seed oil comprises tobacco seed oil.

6. The method of claim 1, wherein the oil comprises at least 60 weight % $C_{17}$ or higher fatty acids.

7. The method of claim 1, wherein the acid comprises about 0.3-5% formic acid.

8. The method of claim 1, wherein the acid comprises about 1% formic acid.

9. The method of claim 1, wherein the treating is performed at a temperature of between about 350° C. and 400° C., at a pressure of about 3500 PSI, or both.

10. The method of claim 1, wherein the activated carbon is comprised in a reactor and the treating is performed in the reactor in a continuous or a non-continuous manner.

11. The method of claim 10, wherein the reactor is a single packed bed tubular continuous reactor and the treating is performed for a time period of about 15 minutes to about 30 minutes.

12. The method of claim 10, wherein the treating is performed in a non-continuous manner for a time ranging from about 50 to about 70 minutes.

13. The method of claim 1, further comprising a process for reforming the liquid hydrocarbons of carbon chain length less than 17 to produce the fuel.

14. A method of producing fuel from oil comprising triacylglycerols, said method comprising:
    processing a plant biomass under subcritical water conditions to produce a biochar;
    activating the biochar to produce an activated carbon essentially free of a metal catalyst; and
    treating an oil under hydrothermal conditions in the presence of i) an acid that acts as an in situ source of hydrogen and ii) the activated carbon essentially free of a metal catalyst,
    wherein the treating comprises hydrolyzing the triacylglycerols in the oil to free unsaturated and saturated fatty acids and glycerol, hydrogenating the unsaturated fatty acids using hydrogen generated by the acid, and converting the saturated fatty acids via decarboxylation and decarbonylation to produce liquid hydrocarbons for use as a fuel.

15. The method of claim 14, wherein the oil comprises a plant oil, a plant seed oil, or a waste oil, and combinations thereof.

16. The method of claim 15, wherein one or more of the plant biomass, the plant oil, and the plant seed oil comprises tobacco.

17. The method of claim 14, wherein the oil comprises at least 60 weight % $C_{17}$ or higher fatty acids.

18. The method of claim 14, wherein the acid comprises about 0.3-5% formic acid.

19. The method of claim 14, wherein the acid comprises about 1% formic acid.

20. The method of claim 14, wherein the treating is performed at a temperature of between about 350° C. and 400° C., at a pressure of about 3500 PSI, or both.

21. The method of claim 14, wherein the activated carbon is comprised in a reactor and the treating is performed in the reactor in a continuous or a non-continuous manner.

22. The method of claim 21, wherein the reactor is a single packed bed tubular continuous reactor and the treating is performed for a time period of about 15 minutes to about 30 minutes.

* * * * *